United States Patent [19]

Murphy et al.

[11] Patent Number: 4,981,750

[45] Date of Patent: Jan. 1, 1991

[54] PRINTING BLANKET WITH LATERAL STABILITY

[75] Inventors: Edward T. Murphy, Douglasville, Ga.; Dennis D. O'Rell, Boxborough, Mass.

[73] Assignee: W. R. Grace & Co.-Conn., Lexington, Mass.

[21] Appl. No.: 299,704

[22] Filed: Jan. 23, 1989

[51] Int. Cl.$^5$ .................................................. B32B 7/00

[52] U.S. Cl. ..................................... 428/220; 428/212; 428/909; 428/247; 428/248; 428/249; 428/250; 428/252; 428/318.6

[58] Field of Search ............... 428/909, 247, 246, 233, 428/236, 317.1, 318.4, 319.9, 220

[56] References Cited

U.S. PATENT DOCUMENTS

| | | | |
|---|---|---|---|
| 3,147,698 | 9/1964 | Ross | 101/149.2 |
| 3,629,047 | 12/1971 | Davison | 161/57 |
| 3,674,139 | 7/1972 | Manasian et al. | 206/83.5 |
| 3,881,045 | 4/1975 | Strunk | 428/215 |
| 3,904,455 | 9/1975 | Goldman | 156/62.4 |
| 4,042,743 | 8/1977 | Larson | 428/306 |
| 4,048,368 | 9/1977 | Hale et al. | 428/909 |
| 4,061,818 | 12/1977 | Duckett et al. | 428/246 |
| 4,224,370 | 9/1980 | Heinemann | 428/246 |
| 4,303,721 | 12/1981 | Rodriguez | 428/213 |
| 4,388,363 | 6/1983 | Fountain | 428/215 |
| 4,548,858 | 10/1985 | Meadows | 428/224 |
| 4,770,928 | 9/1988 | Gaworowski et al. | 428/284 |
| 4,812,857 | 3/1989 | O'Rell et al. | 428/283 |

*Primary Examiner*—George F. Lesmes
*Assistant Examiner*—Terrel Morris
*Attorney, Agent, or Firm*—John Dana Hubbard; William L. Baker

[57] ABSTRACT

A printing blanket having excellent lateral stability comprised of a carcass formed of one or more layers of woven fabric with low machine direction elongation characteristics, a nonwoven fabric attached to an upper surface of the lower most woven fabric layer, a compressible layer secured to the upper surface of the carcass and an ink transfer layer imposed upon the upper surface of the compressible layer. The blanket having a carcass containing a nonwoven layer comprised of continuous or discontinuous filaments, displays excellent cross machine direction elongation stability.

5 Claims, 1 Drawing Sheet

PRINTING BLANKET WITH LATERAL STABILITY

This invention relates to a printing blanket having superior lateral stability. More particularly it relates to a printing blanket having a nonwoven, preferably a continuous filament, layer which provides lateral support to the blanket.

BACKGROUND OF THE INVENTION

Printing blankets are generally formed of several layers including an upper ink transfer or printing layer, a compressible or deformable middle layer and a lower carcass layer.

The carcass layer is generally formed of several layers of woven fabric bonded together by adhesive.

The carcass fabric is typically formed of natural, synthetic or mixed fibers. The fabrics are normally highly stretched in the machine (warp) direction. These fabrics are desirable in that they tend to produce blankets having low levels of elongation or stretch around the blanket cylinder during its use on a printing press. The use of fabrics with low machine direction elongation reduces the need for periodically tightening the blankets on a cylinder.

Unfortunately, these low machine direction elongation fabrics have a very high cross machine (fill) direction elongation characteristic. This is due, in large part, to the design of the fabric, namely that the machine direction fibers lie in a coplanar relationship to each other and the cross machine direction fibers follow a sinusoidal pattern over and under the machine direction fibers. This sinusoidal pattern results in a fabric having a high level of cross machine direction elongation at even low levels of force.

Cross machine direction elongation is a problem in that it causes the blanket to stretch and expand along the edges which reduces the print quality along the blanket edges. Typically, this problem has been eliminated by reducing the print width or using an oversized blanket and cylinder to achieve the desired print width. Either alternative is costly in that it underutilizes the paper and/or machine capacity.

Another alternative is to use a fabric having a higher machine direction elongation characteristic and therefore a corresponding lower cross machine direction elongation characteristic. This, however, is not acceptable as an increase in the machine direction stretch of the blanket requires more frequent tightening of the blanket and therefore a greater amount of downtime.

A further alternative is to add to the blanket one or more layers of monofilaments rods in a cross machine direction, such as shown in U.S. Pat. No. 4,224,370. This however substantially increases the overall thickness of the blanket and decreases the resiliency of the blanket which is not acceptable in most printing applications.

Another alternative is to use a blanket such as that described in U.S. Pat. No. 3,147,698 which incorporates a latex impregnated, heat set paper product as a compressible layer. This layer also serves as a cross machine direction stabilizing member due to its physical properties (low elongation and high modulus). This product has limited compressible properties making it undesirable in those cases where high resilience and high compressibility are required or desired.

The present invention solves the problem of cross machine elongation without significantly increasing the overall thickness of either the blanket or lower carcass layer, reducing the resiliency of the blanket or increasing the machine direction elongation characteristics of the blanket.

SUMMARY AND THE OBJECTS OF THE INVENTION

It has been unexpectedly discovered that the incorporation of a nonwoven material into the carcass layer of the printing blanket significantly improves the cross machine directional stability without adversely affecting the blanket's thickness, machine direction elongation characteristics, printing quality or useful life.

It is an object of the present invention to provide a printing blanket having an ink transfer layer, an intermediate compressible or deformable layer and a carcass layer wherein the carcass layer is formed of a laminate having one or more layers of woven fabric having low elongation in the machine direction and a nonwoven fabric sandwiched between and bonded to at least one of the layers of woven fabric.

It is a further object of the present invention to provide a printing blanket having a first woven fabric layer, a nonwoven fabric layer upon the first woven fabric layer, a second woven fabric layer upon the nonwoven fabric layer, a compressible elastomeric layer on the second fabric layer and an upper ink transfer layer on the compressible layer.

Another object of the present invention is to provide a printing blanket having excellent low elongation characteristics in both the machine and cross machine directions.

An additional object of the present invention is to provide a printing blanket comprised of a carcass layer having excellent low elongation characteristics in the cross machine direction without sacrificing the low elongation characteristics in the machine direction or increasing the overall thickness of the printing blanket or substantially changing the thickness of each individual layer.

A further object of the present invention is to provide a carcass comprising a first and second layer of woven fabric having a low elongation characteristic in the machine direction and a nonwoven, preferably continuous filament, layer sandwiched between the first and second layers.

Another object is to provide a laminated carcass for a printing blanket that has low elongation characteristics in both the machine and cross machine direction.

An additional object is to provide a laminated fabric layer comprising an upper and lower layer of woven fabric and an intermediate layer of a nonwoven, preferably continuous filament, fabric.

These and other objects of the present invention will be made clear in the specification, drawings and appended claims.

DETAILED DESCRIPTION OF THE INVENTION

Figure 1:
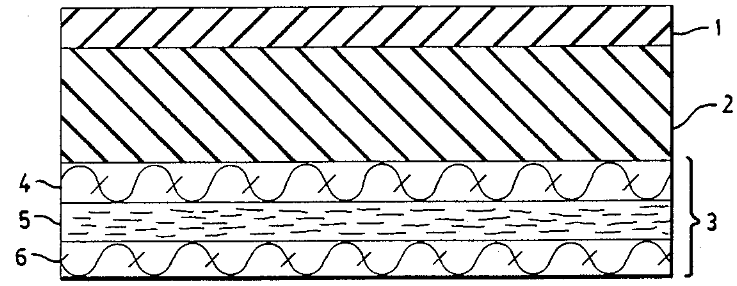
FIG. 1 shows a cross sectional view of a preferred embodiment of the present invention.

FIG. 1 shows a printing blanket representing a preferred embodiment of the present invention having an ink transfer layer 1, a compressible layer 2, and a carcass layer 3.

The carcass layer 3 is a laminate of two or more layers, preferably three or more layers, adhesively bonded together.

The first fabric layer 4 and the second fabric layer 6 are formed of a conventional woven fabric having low elongation characteristics in the machine direction. Suitable fabrics can be made from natural materials such as cotton or rayon, synthetic materials such as polyester, polypropylene or other polyolefinic fibers, polyamides, including aramid or Kevlar® type fibers, glass, metal and other inorganic fibers or mixtures of natural and synthetic fibers. The selected weave can be any conventionally used in printing blankets such as a duck, twill, plain or drill so long as it can be processed to provide the desired low elongation characteristics in the machine direction.

Each of the fabric layers, 4 and 6, are preferably formed of woven cotton fabric having a thickness from about 8 mils to about 25 mils, preferably about 11 mils to 16 mils in thickness. The ultimate machine direction elongation at break of the selected fabric should be from about 2% to about 8%, preferably about 4% to 6%.

Sandwiched between the fabric layers, 4 and 6, is a nonwoven fabric, 5. This fabric may be comprised of either continuous or discontinuous filaments. By continuous filament, it is meant a nonwoven fabric substantially formed of any, randomly oriented, continuous fiber of an indefinite length. Such nonwoven, continuous filament fabrics can be made by various methods including spinning (also known as spin bonding). Generally, the fiber is formed from a liquid mass extruded through a nozzle which forms a fiber. Either the nozzle or the support onto which the fiber is deposited moves so as to form a randomly oriented material. Preferably, such a fabric is bonded to itself where one portion of the continuous filament overlays another portion.

The nonwoven fabric, used in the present invention should have a high tensile strength and a high modulus of rigidity, minimal elongation characteristics and excellent tear strength and dimensional stability characteristics.

Suitable nonwoven fabrics can be made of natural or synthetic materials, with synthetics being preferred. Preferred materials include polyesters, polyesters coated with polyamides, polyolefins such as polypropylene and polyethylene, polyolefin copolymers such as ethylene-propylene copolymers and nylon, aromatic polyamides, also known as "aramides", polyvinyl chloride and copolymers thereof, metal and glass. An example of a preferred nonwoven, continuous filament fabric is made from polyethylene terephthalate and is sold under the trade name "REMAY"® fabric. Another example of a preferred continuous filament nonwoven is sold under the trade name "COLBACK®" by the Non-Wovens Product Group of ENKA.

The nonwovens fabrics can also be prepared from discontinuous fibers having lengths ranging from 0.10 inches to more than 3 inches with the more preferred length being 0.25 inches to 1.0 inches. These fibers may be composed of the same classes of materials as the continuous filament based nonwovens. The individual fibers may be thermally bonded to one another or adhesively bonded to form a fabric having good physical integrity. An example of a material of this type is a 0.005 inch thick glass mat product sold by Manville Corporation.

The laminated carcass layer 3 is formed by bonding the several layers together such that the nonwoven layer is in between the first fabric layer, 4 and the second fabric layer 6. Preferably, the layers are bonded together by a suitable adhesive though other methods of bonding may also be used. One method of forming the laminated carcass layer 3 is to coat the inner surfaces of the fabric layers 4 and 6 with an adhesive, place the nonwoven layer 5 between the inner surfaces of the outer layers 4 and 6 and allow the adhesive to bond the layers together. Preferably, an amount of pressure sufficient to ensure overall bonding should be used. More preferably, when one wishes to minimize the overall thickness of the laminate, additional pressure, such as can be obtained from a rotocure or a high pressure lamination press, may be used.

The compressible layer 2 is attached to the outer surface of the fabric layer 4. By compressible, it is meant to include both "compressible" as in the material when subjected to pressure falls in upon itself, and also "deformable" i.e. that it is displaced laterally when subjected to pressure. This layer 2 may either be foamed or unfoamed. The layer 2 may be formed of any elastomeric material which has good integrity and resilience. The layer should be from about 0.008 to about 0.025 inches in thickness, more preferably 0.015–0.020 inches.

Suitable elastomeric materials include natural rubber, synthetic rubbers, such as nitrile rubbers, styrenebutadiene copolymers, polybutadiene, acrylic rubbers, various olefinic copolymers including ethylene-propylene rubbers, polyurethanes, epichlorohydrins, chlorosulfonated polyethylenes, silicone rubbers and fluorosilicone rubbers. A nitrile rubber based adhesive is preferred.

Additional ingredients commonly added to rubber compositions such as fillers, stabilizers, pigments, plasticizers, crosslinking or vulcanizing agents and blowing agents may be used in this layer.

The compressible layer, if foamed, may have either a closed or open cell structure. The preferred compressible layer is formed of a closed cell foam of nitrile rubber. Such a layer and methods of making it are taught in U.S. Pat. No. 4,303,721, U.S. Pat. No. 4,548,858, U.S. Pat. No. 4,770,928 and U.S. Pat. No. 4,042,743 which are incorporated herein by reference.

The compressible layer 2 is attached to the carcass layer 3 by various means including an adhesive such as a nitrile adhesive or by direct bonding and crosslinking of the compressible layer 2 to the upper surface of the outer layer 4 of the carcass layer 3. It may also be produced as taught in U.S. Pat. 4,548,858.

An ink transfer surface is bonded to the upper surface of the compressible layer 2. This may be achieved by having the ink transfer surface coreact with the compressible layer or by an adhesive layer, for example a nitrile based adhesive. The layer 1 may be comprised of any of the materials described for use in the compressible layer 2, but should not be foamed and preferably is void free. The layer should be from about 0.001 to about 0.020 inches in thickness, preferably about 0.005 to 0.007 inches in thickness and have a durometer of from about 40 to about 60 SHORE A hardness.

The overall thickness of the blanket shown in FIG. 1 should be similar to that of a conventional 3 ply blanket, namely from about 0.065 to about 0.069 inches but may be from 0.034 to 0.100 inches thick. The ultimate elongation at break in the machine direction should be from about 3% to about 8%.

Elongation in the cross machine direction should be from about 10 to about 50%, more preferably from 10% to about 30%.

Figure 2:
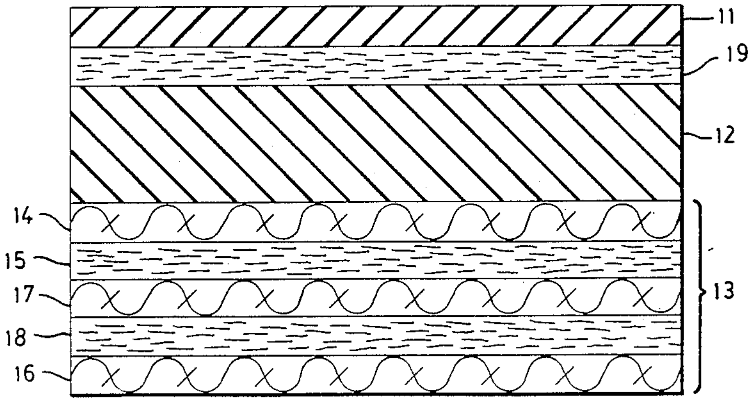
FIG. 2 shows a cross sectional view of another preferred embodiment of the present invention.

FIG. 2 shows another embodiment of the present invention wherein the carcass layer 13 is a laminate formed of multiple, alternating layers of woven, low machine direction elongation fabrics, 14, 16 and 17 (identical in structure and properties to layers 4 and 6 of FIG. 1) and nonwoven fabrics, 15 and 18 (identical in structure and properties to the layer 5 of FIG. 1).

Optionally, an upper stabilizing layer, 19, may be inserted and bonded between the ink transfer layer 11 and the compressible layer 12. This stabilizing layer may be formed of a woven fabric, a hard rubber layer, a polymeric film or preferably, a thin nonwoven layer similar to that used in the carcass layer. This layer provides the blanket with additional stability and also modifies its ability to transport paper through the printing nip.

Another preferred embodiment of the present invention, which is not shown, comprises a printing blanket as described in the embodiment of FIG. 1 but deleting the upper fabric layer 4.

As mentioned hereinabove, an adhesive may be used to bond the respective layers together. Any adhesive that is compatible with the various layers and provides a strong, permanent bond may be used. Suitable adhesives include but are not limited to cured or curable elastomeric adhesives comprised of an elastomer such as synthetic rubbers, including nitrile rubbers, silicone and fluorosilicone rubbers, polyacrylic polymers, polyurethanes, epichlorohydrins and chlorosulfonated polyethylenes. A nitrile rubber based adhesive is preferred.

The printing blanket can be formed by a variety of methods. One method is to form a laminate of all of the respective layers in their proper position with a suitable adhesive between each layer and bond the blanket together with heat or pressure or both. A preferred method is to form the laminated carcass first by coating the inner surface of each woven fabric with a suitable adhesive and place the nonwoven fabric against the coated surface. The sandwich is then laminated together using equipment well known in the art, including a laminator, a rotocure or lamination press so as to subject the laminate to sufficient pressure and temperature to form a carcass, the overall thickness of which is equal to or less than the sum of the thickness of the individual layers. The compressible layer is then coated onto the upper surface of the carcass and bonded thereto and/or if desired, foamed in place.

If necessary or desired, the compressible layer is then ground to a desired caliper. An adhesive coating is applied to the top of the compressible layer and an ink transfer layer is then coated onto the adhesive layer and cured.

EXAMPLE I

Two layers of cotton fabric having a nominal thickness of 0.015 inches were each coated with a 0.002 inch coating of a nitrile rubber based adhesive on one side, a 0.006 inch thick continuous filament, nonwoven polyester fabric, known as REMAY® fabric, available from REEMAY, INC. (P.0. Box 571, Old Hickory, Tenn. 37138), was placed between the two coated surfaces of the fabric layers. The sandwich was laminated together in a rotocure at about 300° and at a belt pressure of about 5 psi for about 3 minutes residence time. The resultant laminate had an overall thickness of 0.0305 inches. The reduction in thickness was believed to have been caused by the compression imposed by the rotocure. The laminate was then tested to determine its stress/strain properties in the cross machine direction using an Instron Model 1113 Universal Testing Instrument at a crosshead speed of 0.2 inches/minute. The results are tabulated in Table 1. A control sample formed of two fabric layers bonded together with adhesive and cured as described above was also tested and the results are tabulated in Table 1. It can be seen that the incorporation of the nonwoven fabric significantly improved the dimensional stability of the carcass in the cross machine direction.

TABLE 1

| % Elongation (Cross Direction) at Various Loading Levels (pounds/inch of width) | | | | | |
|---|---|---|---|---|---|
| Pounds/Inch: | 1 | 5 | 10 | 25 | 40 |
| Control (Without Stabilizing Layer) | .88 | 9.25 | 17.5 | 26.5 | 30.4 |
| Sandwich With Nonwoven Stabilizing Layer | .25 | 1.5 | 5.4 | 23.8 | 28.8 |

EXAMPLE II

A printing blanket incorporating a laminated carcass of the present invention was prepared as follows:

A single layer of fabric having a closed cell foam layer adhered to one side was prepared using the general procedures outlined in U.S. Pat. No. 4,303,721. The opposite side of the fabric was coated with a solution of a nitrile based adhesive in sufficient quantity to deposit 0.002 inches of dry adhesive. A plain piece of fabric, having a nominal thickness of 0.015 inches was also coated with the same adhesive solution in sufficient quantity to yield 0.002 inches of dry adhesive. A layer of 36 g/m$^2$ REMAY® fabric (0.004 inches thick as measured by a Cady micrometer) available from REEMAY, INC. was placed between the two layers of adhesively coated fabrics (adhesive layers facing the REMAY® fabric) and the composite was passed through a rotocure. The temperature of the rotocure was about 270° F., the belt pressure was about 5 psi, and the residence time was about 3 minutes.

The composite structure was then converted into a finished blanket following the teachings in U.S. Pat. No. 4,303,721 regarding grinding of the foam layer, coating with a layer of hard rubber and a layer of ink receptive surface rubber. The hard rubber and ink receptive layers were cured by heating at 290° F. in an inert atmosphere for at least 1 hour.

The printing blanket of this invention was tested in an MTS servohydraulic test machine at a crosshead speed of 2.0 inches/ minute. The lateral stability results are summarized in Table II.

A control printing blanket identical to that above, but having a carcass comprised of only two layers of woven fabric having low machine direction elongation characteristics, was prepared and tested and the results are also summarized in Table II.

TABLE II

| Lateral Stability of Printing Blanket | | |
|---|---|---|
| | Invention | Control |

TABLE II-continued

| Lateral Stability of Printing Blanket | | |
|---|---|---|
| Overall Thickness (0.000 inch) | 68 | 69 |
| Carcass Thickness (0.000 inch) | 23.8 | 23.5 |
| % Elongation (Laterally) | Strain (psi) | |
| 1.5 | 46 | 17 |
| 3.0 | 120 | 66 |
| 4.5 | 157 | 92 |
| 6.0 | 195 | 109 |
| 7.5 | 225 | 126 |
| 9.0 | 263 | 147 |
| 10.0 | 303 | 166 |

It can be seen from the results in Table II that the use of the laminated carcass of the present invention in a printing blanket significantly improved the lateral or cross machine directional stability of the blanket.

In summary, it can be seen from the examples that the present invention provides a printing blanket which has excellent lateral stability without significantly increasing the blanket's thickness or sacrificing its machine direction low elongation characteristics.

While the invention has been described with reference to its preferred embodiments, other embodiments can achieve the same results. Variations and modifications of the present invention will be obvious to those skilled in the art and it is intended to cover in the appended claims all such modifications and equivalents as fall within the true spirit and scope of the invention.

We claim:

1. A printing blanket comprising:
(a) a first woven fabric layer;
(b) a nonwoven, filament layer secured to an upper surface of the first fabric layer;
(c) a second woven fabric layer secured to an upper surface of the nonwoven, filament layer;
(d) a compressible layer secured to an upper surface of the second woven fabric layer; and
(e) an ink transfer layer bonded to an upper surface of the compressible layer.

2. The printing blanket of claim 1 wherein the first and second woven fabric layers are made from fibers selected from the group consisting of cotton, rayon, aromatic polyamides, polyesters, polyolefins or mixtures thereof; the nonwoven fabric is comprised of a material or materials selected from the group consisting polyesters, polyolefins, polyamides, metal, or glass; the compressible layer is formed of an elastomeric material selected from the group consisting of natural rubbers, synthetic rubbers, olefinic copolymers, acrylic rubbers, polyurethanes, epichlorohydrins, chlorosulfonated polyethylenes, silicone rubbers and fluorosilicone rubbers; and the ink transfer layer is void free and formed of an elastomeric material selected from the group consisting of natural and synthetic rubbers, silicone and fluorosilicone rubbers, olefinic copolymers, acrylic rubbers, polyurethanes, epichlorohydrins and chlorosulfonated polyethylenes.

3. The printing blanket of claim 7 wherein the printing blanket is from about 0.034 inches to about 0.100 inches in thickness, has a machine direction elongation of from about 3% to about 8% and a cross machine direction elongation of from about 10% to about 50%.

4. The printing blanket of claim 1 wherein the layers are bonded together by a cured elastomeric adhesive comprised of an elastomer chosen from the group of synthetic rubbers including nitrile rubbers, silicone and fluorosilicone rubbers, polyacrylic polymers, polyurethanes, epichlorohychrins and chlorosulfonated polyethylenes.

5. A printing blanket comprising:
(a) a first woven fabric layer;
(b) a non woven fabric layer secured to an upper surface of the first fabric layer, wherein the nonwoven fabric is selected form the group consisting of continuous filament fabrics and discontinuous filament fabrics;
(c) a second woven fabric layer secured to an upper surface of the nonwoven fabric layer;
(d) a compressible layer secured to an upper surface of the second woven fabric layer; and
(e) an ink transfer layer bonded to an upper surface of the compressible layer.

* * * * *